United States Patent
Franceschini et al.

(10) Patent No.: US 7,991,123 B2
(45) Date of Patent: Aug. 2, 2011

(54) CONTROL CIRCUIT FOR CAUSING CYCLIC APPLICATION OF SEALING CURRENT FOR LOCAL LOOPS SUPPORTING DATA NETWORK TELEPHONY

(75) Inventors: Paul Franceschini, Petaluma, CA (US); Franciscus Maria Ploumen, Windsor, CA (US); Bakri Aboukarr, Kanata (CA); Andrew Gordon Tomilson, Nepean (CA); Michael Edward Smelters, Kanata (CA); Mary Ann Condie, Kanata (CA)

(73) Assignee: Alcatel Lucent, Paris (FR)

( * ) Notice: Subject to any disclaimer, the term of this patent is extended or adjusted under 35 U.S.C. 154(b) by 1151 days.

(21) Appl. No.: 11/576,770

(22) PCT Filed: May 19, 2005

(86) PCT No.: PCT/US2005/017965
§ 371 (c)(1),
(2), (4) Date: Apr. 5, 2007

(87) PCT Pub. No.: WO2006/052288
PCT Pub. Date: May 18, 2006

(65) Prior Publication Data
US 2008/0205631 A1   Aug. 28, 2008

Related U.S. Application Data

(60) Provisional application No. 60/626,811, filed on Nov. 10, 2004.

(51) Int. Cl.
*H04M 1/24* (2006.01)
(52) U.S. Cl. .............. 379/27.04; 379/22; 379/26.02
(58) Field of Classification Search .... 379/27.01–27.04, 379/22
See application file for complete search history.

(56) References Cited

U.S. PATENT DOCUMENTS

| | | | |
|---|---|---|---|
| 5,661,778 A * | 8/1997 | Hall et al. | 379/29.01 |
| 6,351,533 B1 * | 2/2002 | Parrott | 379/412 |
| 6,532,277 B2 * | 3/2003 | Ulanskas et al. | 379/27.01 |
| 6,754,309 B2 * | 6/2004 | Nakagawa et al. | 379/27.01 |
| 7,508,814 B1 * | 3/2009 | Barzegar et al. | 370/352 |
| 7,773,744 B1 * | 8/2010 | Joffe | 379/412 |

FOREIGN PATENT DOCUMENTS

| | | |
|---|---|---|
| JP | 03250962 A | 11/1991 |
| WO | 0072623 A1 | 11/2000 |

* cited by examiner

*Primary Examiner* — Simon Sing
(74) *Attorney, Agent, or Firm* — RG & Associates

(57) ABSTRACT

A system for causing application of sealing current to one or more local telephony loops has a current source; a switching interface for connecting the current source to the one or more telephony loop interfaces; and a machine-readable instruction accessible to the switching interface, the instruction providing intelligence to the switching interface for identifying the one or more loops to be serviced, the time period for current application to each loop serviced, and a sequence order when more than one loop is serviced.

21 Claims, 3 Drawing Sheets

CONTROL CIRCUIT FOR CAUSING CYCLIC APPLICATION OF SEALING CURRENT FOR LOCAL LOOPS SUPPORTING DATA NETWORK TELEPHONY

CROSS-REFERENCE TO RELATED APPLICATIONS

The present invention claims priority to a provisional patent application 60/626,811 filed on Nov. 10, 2004, entitled "Cycled Sealing Current". The entire disclosure of said provisional patent application is included herein at least by reference.

BACKGROUND OF THE INVENTION

1. Field of the Invention

The present invention is in the field of data-packet-telephony and pertains particularly to methods and apparatus for enabling controlled application of sealing current for twisted pair loops in data-network-telephony architectures.

2. Discussion of the State of the Art

In the field of telephony, copper line local loops described as those local loops that exist between a central office CO and customer premise equipment (CPE) in a given service area, require a sealing current to help maintain line integrity in reducing oxidation. A sealing current as defined in the Bell core and CCITT Layer 1 specifications is a low current (1-20 mA typically for POTS) direct current DC applied to a copper pair (loop) by a subscriber line interface circuit (SLIC) controlled by line usage by end devices. Sealing current is required to reduce oxidation at splice points and to aid in maintaining electrical integrity in the line.

In plain old telephony service (POTS), sealing current is applied when the telephone receiver is picked up or is "off hook". A SLIC typically enables the alternate current states for the line and is controlled by the subscriber activity on the line. In POTS telephony, application of sealing current is efficient because the subscribers automatically control it or "cycle" it whenever they use the line and when the line is not used no sealing current is applied therefore, cost is proportional to line use.

More recently, with the advent of digital subscriber line (DSL) services, including ADSL (asynchronous) and VDSL (very high bit-rate), the network architecture is becoming more complex in terms of equipment used. One with skill in the art will appreciate that the ambiguity between pure digital network telephony architecture and POTS telephony architecture results from a fact that digital telephony equipment and lines and POTS equipment and lines are both in service with respect to a typical DSL network environment. State-of-art digital services are hybrid with existing public-switched-telephony-network (PSTN) services and rely still on much of the old architecture, largely for cost efficiency reasons. That is to say that it may be cost prohibitive for large companies owning their own PBX systems and the like to switch over to pure DNT network architecture. SLICs in the POTS architecture still control the application of sealing current for local loop integrity existent between a CO) and CPE.

In todays network environment some companies are providing IP telephony solutions such as wideband IP telephone systems. These hybridized systems are still interfaced with a traditional SLIC between CO and CPE equipment. Eventually typical POTS telephones and traditional SLICs will no longer be required or used in telecommunications networks as more and more subscribers opt for pure wireless and broadband telephony services. In some isolated networks, pure DSL-based service is available wherein no analog-type telephone systems are present. In these scenarios with no POTS telephones or SLICs, sealing current is applied as a constant current over all of the affected local wire loops between the CO and CPE.

Contemplating that there may be tens of thousands of local loops per typical CO, the prospect of providing a constant simultaneous current over that many loops in a pure digital network may be costly in terms of added equipment capacity required to generate the current. The implementation may also be somewhat compromised by arising thermal limitations for each of the current generating devices that must constantly generate the sealing current. It is also noted herein that VDSL, a higher rate broadband service, is now required for newer video services. VDSL implementation involves more outside-plant equipment, which is more sensitive to power consumption than normal thermal dissipation units.

Also in the above paragraph, we should note that higher rate broadband (VDSL) is required for newer video services and thus require more Outside Plant equipment that is much more sensitive the power consumption and thermal dissipation limits.

What is clearly needed in the art is a method and apparatus for controlling application of sealing current for maintaining integrity of local loops in a fashion that does not require constant current generation and delivery and without requiring POTS telephones to trigger application of the sealing current. Such a method and apparatus would enable pure DSL-based architectures to expand in a more cost efficient manner without requiring POTS integration and hybridization.

SUMMARY OF THE INVENTION

A system for causing application of sealing current to one or more local telephony loops is provided. The system includes a current source; a switching interface for connecting the current source to the one or more telephony loop interfaces; and a machine-readable instruction accessible to the switching interface, the instruction providing intelligence to the switching interface for identifying the one or more loops to be serviced, the time period for current application to each loop serviced, and a sequence order when more than one loop is serviced.

In one embodiment, the current source is a battery, and the switching interface is a line card hosting a programmable integrated circuit. In this embodiment, the one or more telephony loop interfaces are line cards. In one embodiment, the system is implemented within a central office switching facility. In another embodiment, the system is implemented as a switching hub outside of a central office switching facility. In one embodiment wherein the switching interface is a line card, the machine-readable instruction is flashed into the integrated circuit on the line card.

In another embodiment, the system includes more than one switching interface each interface controlling application of current to an assigned group of telephony loop interfaces. In this embodiment, each interface is a host line card and the assigned groups of telephony loop interfaces comprise other line cards sharing a shelf with the host line card, the system scalable to expansion by adding shelves.

In one embodiment, the one or more local loops comprise a business or residential telephony service area void of plain old telephony service devices and subscriber line interface circuits.

According to another aspect of the present invention, a method for programming a switching interface to cause sealing current to be applied to one or more telephony loops serviced by a central office switching facility is provided. The method includes steps for (a) identifying and listing the one or more loops to be serviced; (b) specifying and recording the time parameters for application of the current to the loops; (c) uploading the instructions of steps (a) and (b) to the switching interface; and (d) activating the switching interface for operation.

In one aspect, the switching interface is a line card, and in step (c), the instructions are uploaded to an integrated circuit on the line card. In this aspect, in step (a), identification includes address information for each loop to be serviced. In one aspect, in step (a) the loops are twisted pair copper loops extending from CPE to a curbside optical fiber switching hub. In all aspects, in step (b), the time parameters include time period specification for each application of current per loop, and at least one start time for processing a group of loops.

In one aspect, in step (c), the uploaded data is in the form of a machine readable instruction flashed into or programmed into to an integrated circuit on the switching interface. Also in one aspect, in step (d), activation comprises booting the device after uploading instruction to the device.

According to yet another aspect of the present invention, a method for applying sealing current to a plurality of local telephony loops controlled by a central office switching facility is provided and includes steps for (a) selecting a first local loop for service; (b) connecting the local loop to a current source; (c) maintaining the connection for a pre-defined period of time; (d) selecting a subsequent local loop for service; (e) switching the connection to the subsequent local loop; and (f) repeat steps (c), (d), and (e) in sequence until all of the loops of the plurality are serviced.

In a preferred aspect in steps (a) and (d), selection is determined by a machine-readable instruction. Also in a preferred aspect, in step (b), connection is accomplished between a line card interface of the loop and the current source. In this aspect in step (b), the current source is a battery source.

In one aspect, in step (e), switching is controlled by an integrated circuit installed on a host line card.

BRIEF DESCRIPTION OF THE DRAWING FIGURES

DETAILED DESCRIPTION

Figure 1:
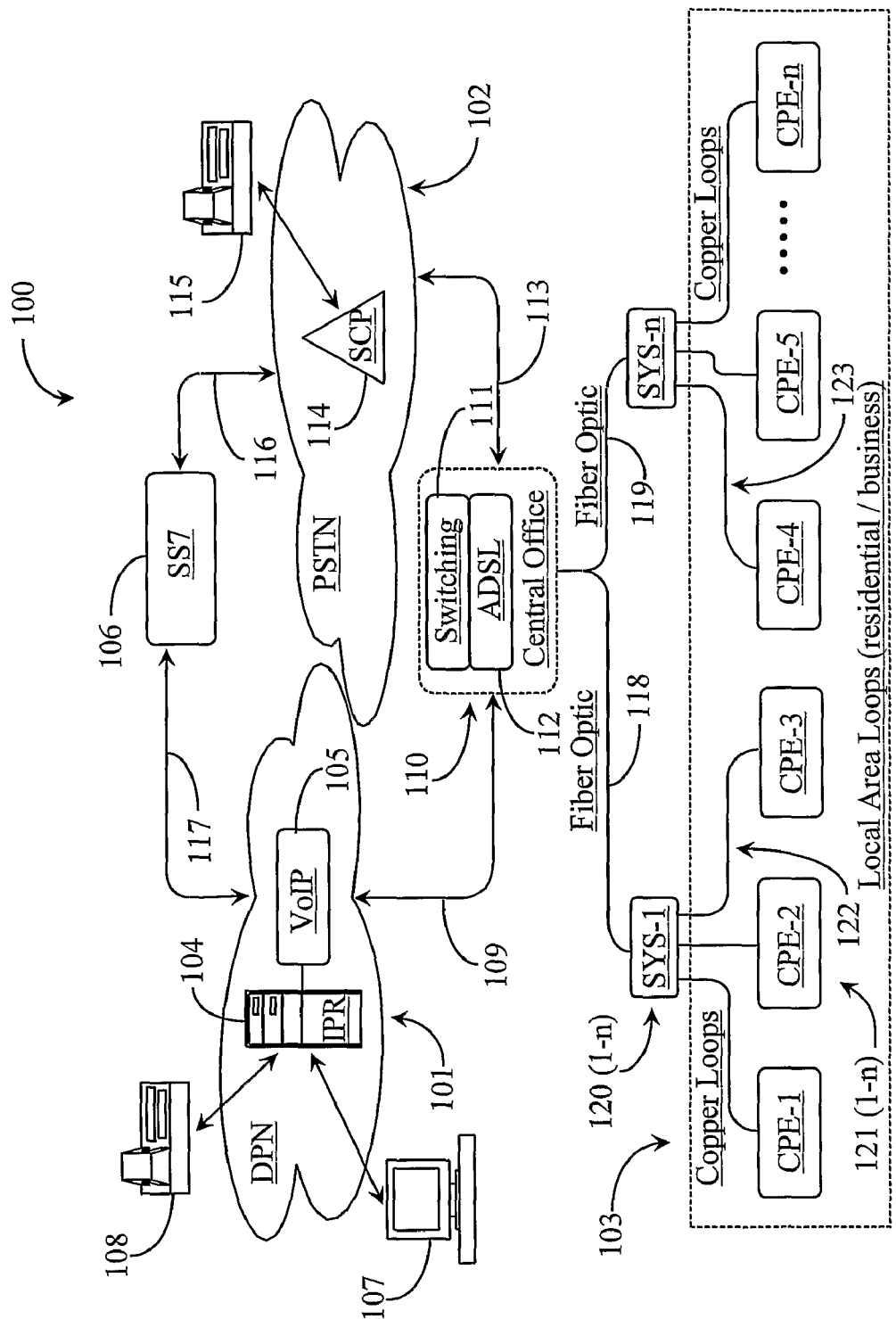
FIG. 1 is a simple overview of telecommunications architecture wherein sealing current application to local telephony loops is practiced according to an embodiment of the present invention.

FIG. 1 is a simple overview of telecommunications network 100 wherein sealing current application to local telephony loops is practiced according to an embodiment of the present invention. Telecommunications network 100 includes a data-packet-network (DPN) 101. DPN 101 may be an Internet network, an Intranet network, or another wide-area-network (WAN) having access to the Internet without departing from the spirit and scope of the present invention. The inventor chooses an Internet network as a preferred example because of its high public access characteristic for a telephony medium. Therefore DPN 101 may hereinafter be referred to also as Internet 101. Internet 101 may also be a wireless municipal-area-network (MAN) in some embodiments without departing from the spirit and scope of the present invention.

Telecommunication network 100 also includes a public-switched-telephone-network (PSTN) 102. PSTN 102 may also be a private telephone network or a public or private wireless telephone network without departing from the spirit and scope of the present invention. The inventor chooses a PSTN network because of its high public access characteristic. As is known in the art of telephony, communications may be bridged between disparate networks such as between Internet 101 and PSTN 102 by way of a network communications bridge or gateway illustrated in this example as a bell core SS7 communications bridging facility 106. Telephony events may originate in network 101 and may be routed over a data line 117 through SS7 106 and telephony trunk 116 into PSTN 102 and then on to the call event destination. Likewise, calls may originate anywhere within PSTN 102 destined for anywhere in Internet 101.

Internet 101 includes an Internet protocol router (IPR) 104 and a voice over Internet protocol VoIP gateway. Other types of soft IP switches, data routers, servers, and the like may be assumed to be present though not illustrated in this simple example. Users accessing Internet-based services, which may be telephony services, include a user 108 operating an IP telephone, and a user 107 operating a personal computer. Telephony events originating from users 108 and 107 are routed to destinations as switched data packets using a network of IP routers such as IPR 104. It may be assumed in this example that users 108 and 107 gain access to Internet 101 by means of an Internet service provider (ISP) using any one of several connection architectures. These connection architectures may include dial-up through PSTN and connection server; cable modem through a cable service; integrated digital services network (ISDN), DSL; and wireless equivalents in some embodiments.

PSTN network 102 has a service control point (SCP) illustrated therein and adapted to receive and process telephone calls. A user 115 operating an analog telephone represents calls entering SCP 114 for further routing. Telephony switches, carrier equipment, and computer/telephony-integration (CTI) processing units may be assumed to be present within PSTN 102 although not specifically illustrated for sake of clarity in description of the invention.

A central office (CO) telephone switching facility 110 is illustrated in this example and has direct communications access to PSTN 102 via a telephony trunk 113. CO 110 is adapted to process telephony events and to service an area of the overall communications network 100 illustrated herein as a residential/business area of local loops 103. In this example, CO 110 also has direct access via a high-speed digital access line 109 to Internet network 101. CO 110 is enhanced in this example, with ADSL service equipment 112 adapted to enable ADSL telephony communications services including Internet telephony services to service area 103 for which CO 110 is responsible. CO 110 also includes telephony processing and switching equipment 111.

In this example, CO 110 maintains a plurality of outside service systems (SYS) 120 (1-n). Systems 120 (1-n) are strategically located near CPE that they service. Service area 103 includes CPE 121 (1-n). Service area 103 may, in one embodiment, be a service area that is completely void of POTS telephones and SLICs for providing sealing current for local loops. Local copper loops are the twisted pair lines that connected each CPE 121 (1-n) in area 103 to a respective service system 120 (1–n). In this example, CPE-1, CPE-2, and CPE-3 are connected for communications to SYS-1 by local loops 122. CPE-4, CPE-5, and CPE-n are illustrated as connected for communications to SYS-n via local loops 123. SYS-1 and SYS-n illustrated in this example are connected to CO 110 by fiber optic cable 118 and fiber optics cable 119 respectively. Therefore, in this particular embodiment, CO 110 runs fiber optics cable out to near CPE locations whereupon copper local loops complete the connection between outside systems and CPE.

It should be noted herein that the architecture illustrated in this example is exemplary only and there are many possible variations in connections and equipment provisions that may instead be assumed present herein without departing from the spirit and scope of the present invention. For example, in one embodiment, outside service systems are not used and local loops extend from CPE all of the way to the CO. In a preferred embodiment, no SLICs or POTS telephony devices are deployed within service area 103 making area 103 a pure DNT network segment relying, in this case on ADSL for telephony services. However, this is not required in order to practice in the present invention. For example, some of CPE 121 (1–n) may include POTS devices and SLICs while others are adapted for pure DNT having no POTS devices or SLICs installed. In this way, the architecture supporting the present invention is scalable for converting formerly POTS service areas to DNT service areas CPE by CPE.

It should also be noted herein that this embodiment represents a case of "curb-side" fiber optic deployment but it is not required in order to practice the present invention. In this example, the apparatus of the invention is deployed in each of SYS 120 (1–n). To enable practice of the present invention, a plurality control circuits (not illustrated) are provided and may be assumed to be installed and operational in each of SYS 120 (1–n) in this particular embodiment as described above. The control circuits may replace SLICs normally used in POTS implementations in a fashion such that fewer control circuits are required to enable function for all local loops. For example in prior art, a subscriber picks up a POTS telephone to initiate or to receive a call event thereby causing sealing current to flow through the loop that the subscriber is connected to. Therefore, each local loop installed to CPE has a line card with a SLIC to control sealing current to that particular loop. Hence, each loop requires one SLIC. Likewise there may be a plurality of POTS devices connected to a single loop. Each SLIC has a minimum and maximum sealing current threshold. As long as at least one subscriber is using the line, sealing current is flowing. If no subscribers are using the line, then no sealing current is flowing. For many POTS applications, there may be pluralities of devices in use for a single loop causing sealing current to flow most of the time during normal use periods.

In a preferred embodiment of the present invention, a single control circuit may replace all of the SLICs for an entire shelf of line cards. This is because the control circuit is adapted to apply sealing current to one loop at a time for a specified period of time until all of the local loops have been serviced. At this point, the process repeats for all of the loops again. Access for the control circuit to the loops may be provided via the line cards using a back plane interface similar to those used in some router configurations. The control circuit, according to a pre-planned schedule, accesses a loop and connects it to the sealing current source for the predetermined amount of time and then moves to the next loop. The control circuit of the present invention may be installed on a host line card in a shelf, or in the case of a very large system, on a control card having access to a group of line cards.

One control circuit of the present invention may, conceivably, handle as many loops as desired as long as the programmable time schedule for servicing those loops may be met and the circuit has access to all the lines it is responsible for. For example, a typical cycle might be to apply current to each loop for a period of 20 seconds one time per 24-hour day. Therefore, 4, 320 loops may be serviced in a 24-hour period by a single control circuit. At 15 seconds per loop, the number that may be serviced by a single control circuit increases to 5, 760 loops per day. However, this requires that the single circuit have line access to all of those individual loops for servicing. This may not be an optimum implementation, in part because of the physical difficulties of providing back plane line access for one control circuit to all of those loops. For convenience and time saving considerations, a more practical deployment might be one control circuit per line-card shelf, or perhaps one circuit per all line cards housed in one piece of service equipment. There are many possibilities.

Figure 2:
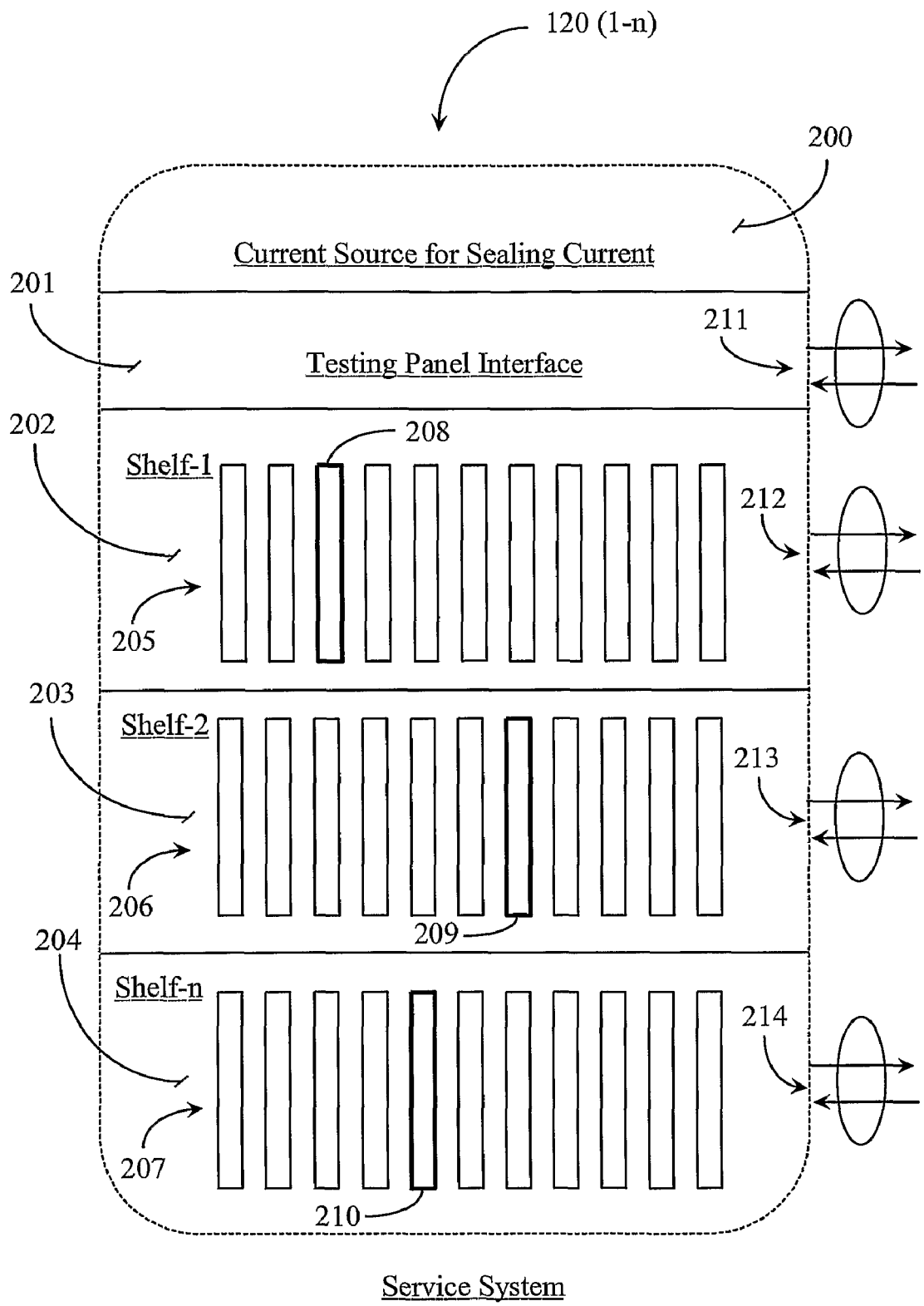
FIG. 2 is a block diagram illustrating a service system equipped for sealing current generation and application according to an embodiment of the present invention.

FIG. 2 is a block diagram illustrating service system (SYS) 120 of FIG. 1 equipped for sealing current generation and application according to an embodiment of the present invention. SYS 120, which may be any SYS 1–n includes a power source 200 for generating sealing current. Power source 200 may be a battery system. In one embodiment, SYS 120 further includes a testing panel interface 201, which may include a communications port 211 over fiber optics to a remote administrator system, perhaps at the CO facility. Interface 211 may provide access to system test modules (not illustrated) for performance or routine line tests including access to any data values resulting from the application of sealing current.

SYS 120 includes, in this simple representation, a line card shelf 202 (Shelf-1); a line card shelf 203 (Shelf-2); and a line card shelf 204 (Shelf-n). There may be more, or fewer line card shelves included within SYS 120 without departing from the spirit and scope of the present invention. Each line card shelf 202-204 has a plurality of line cards installed thereon. Shelf-1 houses line cards 205, shelf-2 houses line cards 206, and shelf-n houses line cards 207. For practical purpose of explanation and to save drawing space, line cards 205, 206, and 207 number only 11 per shelf as illustrated, however it will be apparent to one with skill in the art that these systems are scalable and may contain far more line cards per shelf, each card supporting one local loop.

Service system 120 includes, in this example, one communication port facility for each shelf of line cards. In this example, ports 212, 213, and 214 are provided for fiber optics communication between the CO and local loops. The local loops, represented herein by line cards 205, 206, and 207 are twisted copper pairs ported out to the serviced CPE premises. In one embodiment, a single port facility is sufficient to handle data traffic between the CO and all of the local loop branches. Switching capability for routing incoming traffic from the CO switch onto local loops is not illustrated in this example, but may be assumed present.

In this embodiment, there is one circuit-hosting line card per shelf of line cards. These are illustrated herein as a host card 208 within shelf-1, a host card 209 within shelf-2, and a host card 210 within shelf 210. It is noted herein that any of line cards 205, 206, or 207 may be selected and adapted to host the control circuit of the present invention. The control circuit replaces the SLIC and provides function for the host card (local loop) and for all or the other line cards (remaining loops) on the shelf. Line card 208 on shelf-1 with the control circuit activated is enabled through programming to conduct a periodic current application cycle for all of the loops supported on the shelf including the loop supported by the host card. In a preferred embodiment, the batch operation is conducted sequentially loop-by-loop until all of the loops supported by a shelf of cards have had sealing current applied for a predetermined amount of time.

The circuit itself, which is not specifically illustrated in this example, can be provided using standard "off-the-shelf" components and is similar in some respects to a SLIC including having a codec or programmed instruction for performing the stated functions. Card 208 provides switched connection between each serviced line card and power source 200 for the pre-determined period of time allotted to each supported loop. No detection circuits related to use of any end devices on a loop are required. All that is required to enable the circuit for stated function is that the circuit host has control access to all of the line cards it supports and that it has access to power source 200. The fabric for enabling sequential loop selection and connection bridging to the power source may be an existing capability on the host line card. The instruction for performing cyclical sealing current application over a conglomeration of loops may be flashed onto the circuit during manufacture, or may be programmed into the circuit memory using a remote computer station through testing panel interface 202.

In one embodiment of the present invention, the circuit may be further adapted to detect any high-open conditions in application of sealing current to any of the loops supported by the host card supporting the circuit. In this embodiment, a notification message may be generated on the host line card and may be sent to a central system location accessible through testing panel interface 201. In this embodiment an administrator accessing the system through interface 201 may be alerted to any abnormal current loss between system 120 and CPE, which may indicate a high open condition that may affect the quality of DSL communication over a particular loop identified in the message.

One with skill in the art of line card communication will recognize that in one embodiment, all line cards in a particular system may be adapted with the circuitry of the present invention without departing from the spirit and scope of the present invention. In such a configuration, the task of application of sealing current over local loops may be assignable such that during maintenance or shutdown periods the task may be rerouted to another line card that is still in service.

Figure 3:
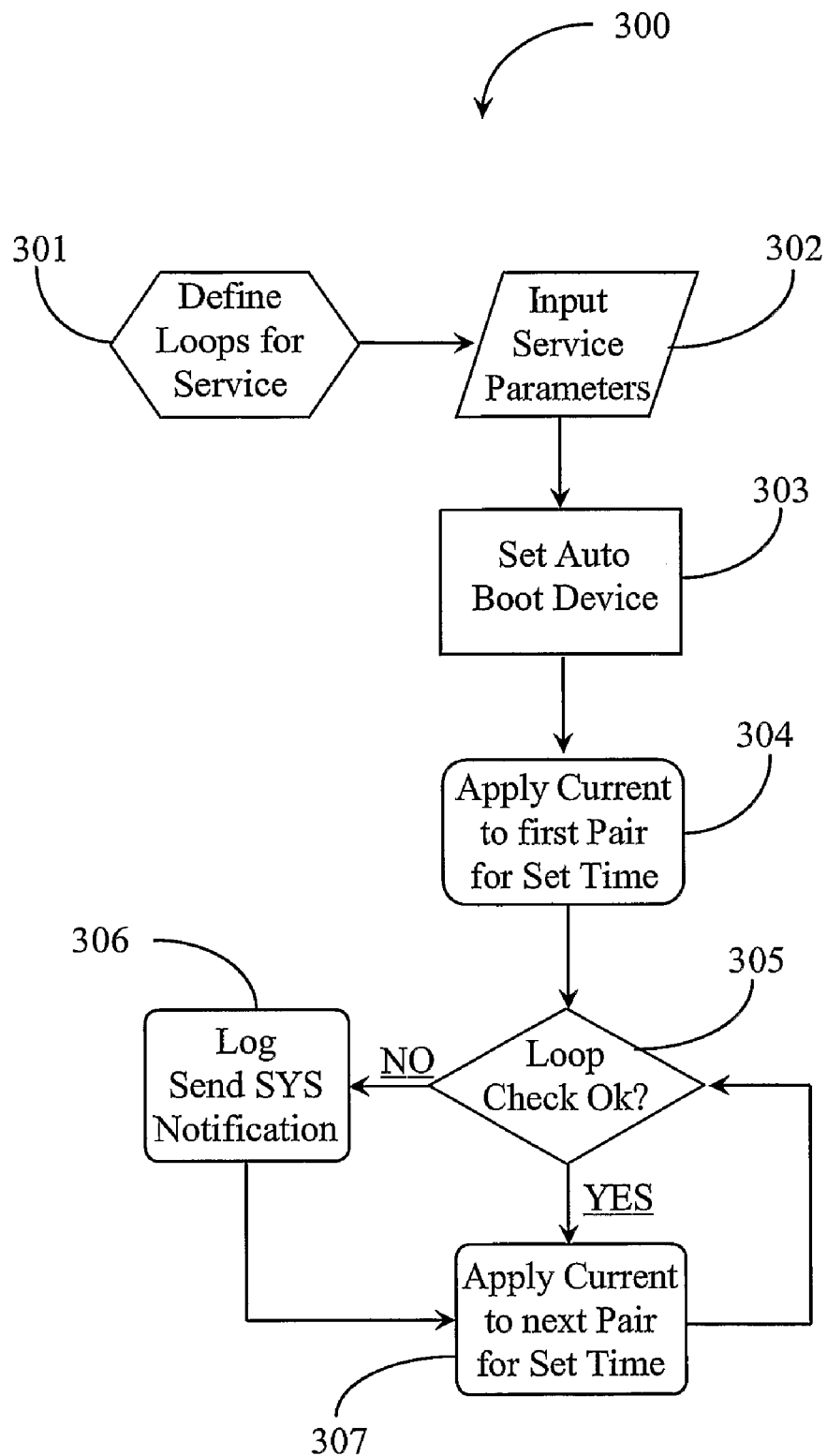
FIG. 3 is a process flow chart illustrating steps for programming a sealing current control circuit for service and for applying the current according to an embodiment of the present invention.

FIG. 3 is a process flow chart 300 illustrating steps for programming a sealing current control circuit for service and for applying the current according to an embodiment of the present invention. At step 301, an administrator defines the local loops for service by the host card. Each card has an address uniquely defining the loop serviced by the card. At step 302, the service parameter are defined and made part of the machine instruction. The service parameters may define the period of current application for each loop and the sequence for application of the current from loop to loop. The frequency of performance of a batch operation with reference to a conglomerate of loops to be serviced may also be defined. For example, an instruction for a conglomerate of identified loops may specify to apply sealing current to loops 1–n for a period of 15 seconds per loop; run twice per 24-hour period; start 9:00 AM (first batch run) and 9:00 PM (second batch run); error logging/messaging turned on.

Once a circuit is programmed for operation, it may be activated at step 303 to begin at boot of the device at step 303. In this case, the tasks will automatically be performed at the specified intervals as long as the device is active in the system. In one embodiment, a manual override capability, accessible to an administrator through a testing panel interface, for example, may be provided to enable cancellation of any part of the specified task instruction during active run state of the host card.

Once online and at the specified start time, the host card aided by the circuit of the invention causes a connection between a power source and a first loop or twisted pair, for the set period of time at step 304. Optionally, at step 305, it is determined whether the loop taking the current checks out ok for the application or not. If not, then at step 306, an entry into an error log adapted for the purpose may be generated and a system notification including an error message may be sent to a system location. The process may then move to the next loop and at step 307 for application of current. Step 307 may resolve back to step 305. If at step 305, it is determined that the loop checks ok then the process may continue directly to step 307 to service the next loop. This cycle repeats until all of the defined loops have been serviced according to the instruction. In one embodiment, steps 305 and 306 are not required. In this embodiment, the process simply runs through the list arbitrarily and performs the sealing current application for each listed loop.

One with skill in the art of integrated circuit architecture will appreciate that the process of the present invention may be accomplished using an integrated circuit adapted for line control and switching without requiring any physical modifications to the circuit itself. The machine instruction of the present invention provides all of the information required by the circuit for accomplishing cyclic sealing current application to loops assigned to the particular circuit host. Practice of the present invention is possible for any batch of loops connected to a system as long as the physical ports are accessible to the host card and the power source may be connected or switched to those ports by the host card.

The process steps described above may vary in order and content somewhat without departing from he spirit and scope of the present invention. For example, instead of applying current sequentially some other loop selection pattern or algorithm may be followed. There may or may not be a step in the process for checking the loop to see whether the application is successful.

The method and apparatus of the present invention may be practiced with or with or without an intermediary outside hub facility or system without departing from the spirit and scope of the present invention. For example local loops may be connected directly to the CO. In this case, application of current may be performed from the point of the CO.

The spirit and scope of the present invention should be afforded the broadest scope under examination. The methods and apparatus of the present invention are limited only by the claims, which follow.

What is claimed is:

1. A system for causing application of sealing current to one or more local telephony loops comprising:
   a current source;
   a switching interface for connecting the current source to the one or more telephony loop interfaces; and
   a machine-readable instruction accessible to the switching interface, the instruction providing intelligence to the switching interface for identifying the one or more loops to be serviced, the time period for current application to each loop serviced, and a sequence order when more than one loop is serviced, wherein each of the one or more loops comprises a subscriber line interface card (SLIC) configured to control sealing current to that particular loop and further configured to support a plurality of customer premises equipment (CPE) devices.

2. The system of claim 1, wherein the current source is a battery and the switching interface is a line card hosting a programmable integrated circuit.

3. The system of claim 2, wherein the one or more telephony loop interfaces are line cards.

4. The system of claim 1 implemented within a central office switching facility.

5. The system of claim 1 implemented as a switching hub outside of a central office switching facility.

6. The system of claim 2, wherein the machine-readable instruction is flashed into a circuit on the line card.

7. The system of claim 1, having more than one switching interface, each interface controlling application of current to an assigned group of telephony loop interfaces.

8. The system of claim 7, wherein each interface is a host line card and the assigned group of telephony loop interfaces comprise other line cards sharing a shelf with the host line card, the system scalable to expansion by adding shelves.

9. The system of claim 1, wherein the one or more local loops comprise a business or residential telephony service area void of plain old telephony service devices and subscriber line interface circuits.

10. A method for programming a switching interface to cause sealing current to be applied to one or more telephony loops serviced by a central office switching facility including steps of:
(a) identifying and listing the one or more loops to be serviced;
(b) specifying and recording the time parameters for application of the current to the loops;
(c) uploading the instructions of steps (a) and (b) to the switching interface; and
(d) activating the switching interface for operation, wherein each of the one or more loops comprises a subscriber line interface card (SLIC) configured to control sealing current to that particular loop and further configured to support a plurality of customer premises equipment (CPE) devices.

11. The method of claim 10, wherein the switching interface is a line card and in step (c), the instruction is uploaded to an integrated circuit on the line card.

12. The method of claim 10 wherein in step (a), identification includes address information for each loop to be serviced.

13. The method of claim 10, wherein in step (a) the loops are twisted pair copper loops extending from CPE to a curbside optical fiber switching hub.

14. The method of claim 10, wherein in step (b) the time parameters include time period specification for each application of current per loop, and at least one start time for processing a group of loops.

15. The method of step 10 wherein in step (c) the uploaded data is in the form of a machine readable instruction flashed into or programmed into to an integrated circuit on the switching interface.

16. The method of claim 10 wherein in step (d) activation comprises booting the device after uploading instruction to the device.

17. A method for applying sealing current to a plurality of local telephony loops controlled by a central office switching facility including steps for:
(a) selecting a first local loop for service;
(b) connecting the local loop to a current source;
(c) maintaining the connection for a pre-defined period of time;
(d) selecting a subsequent local loop for service;
(e) switching the connection to the subsequent local loop; and
(f) repeat steps (c), (d), and (e) in sequence until all of the loops of the plurality are serviced, wherein each of the one or more loops comprises a subscriber line interface card (SLIC) configured to control sealing current to that particular loop and further configured to support a plurality of customer premises equipment (CPE) devices.

18. Then method of claim 17 wherein in steps (a) and (d), selection is determined by a machine-readable instruction.

19. The method of claim 17 wherein in step (b), connection is accomplished between a line card interface of the loop and the current source.

20. The method of claim 17 wherein in step (b) the current source is a battery source.

21. The method of claim 17 wherein in step (e), switching is controlled by an integrated circuit installed on a host line card.

* * * * *